United States Patent [19]

Lijzenga et al.

[11] 4,332,703

[45] Jun. 1, 1982

[54] PLASTIC BITUMINOUS COMPOSITIONS

[75] Inventors: Jan Lijzenga; Gerrit Van Gooswilligen; Thomas C. Blanken, all of Amsterdam, Netherlands

[73] Assignee: Shell Oil Company, Houston, Tex.

[21] Appl. No.: 235,347

[22] Filed: Feb. 17, 1981

[30] Foreign Application Priority Data

Mar. 31, 1980 [GB] United Kingdom ............... 10836

[51] Int. Cl.³ .................. C08L 9/00; C08L 95/00
[52] U.S. Cl. ............................ 524/68; 106/269; 106/DIG. 7; 524/394; 524/474
[58] Field of Search ............ 260/23.7 R, 23.7 M, 260/23 R, 28.5 AS; 106/269, DIG. 7

[56] References Cited

U.S. PATENT DOCUMENTS 2,978,357  4/1961  Fugazza ..................... 106/269
3,014,809  12/1961  Hoyt et al. ................. 106/269
3,329,636  7/1967  Henschel ................ 260/28.5 AS
3,442,841  5/1969  Adelman ................ 260/28.5 AS

FOREIGN PATENT DOCUMENTS 1329298  9/1973  United Kingdom .

*Primary Examiner*—Ronald W. Griffin
*Attorney, Agent, or Firm*—Dean F. Vance

[57] ABSTRACT

Plastic bituminous compositions comprising
(a) 100–30 % w of a mixture of
  1. 45–99.8 % w of a bituminous component having a penetration of less than 800 (0.1 mm) at 25° C.,
  2. 0.1–30 %w of a lithium salt of a $C_{10}$–$C_{40}$ (hydroxy) fatty acid, and
  3. 0.1–25 %w of a thermoplastic polymer, and
(b) 0–70 %w of a filler having excellent self-adhesive properties even when applied on wet or wetted surfaces. They are cold applicable and shear-stable.

10 Claims, No Drawings

PLASTIC BITUMINOUS COMPOSITIONS

BACKGROUND OF THE INVENTION

1. Field of the Invention

The present invention relates to novel plastic bituminous compositions which are especially useful in the preparation of articles having self-adhesive properties based on plastic bituminous compositions according to the present invention and which are cold applicable. The invention also relates to articles having self-adhesive properties based on such plastic bituminous compositions. The compositions according to the present invention comprise at least a bituminous component, a thermoplastic polymeric component and a lithium salt of a (hydroxy) fatty acid.

2. The Prior Art

Compositions comprising a bituminous component and a lithium salt of a (hydroxy) fatty acid are known in the art (e.g., from U.S. Pat. No. 3,014,809). They can be applied in the production of speciality products such as battery-box sealants and water-resistant membranes. Such compositions, however, are not shear-stable, which causes many problems during their application when exposed to frequent stresses.

Compositions comprising a bituminous component, and certain block copolymers are also known (e.g., from British Patent Specification Nos. 1,329,298 and 1,481,056). Such compositions can be used in the preparation of articles having pressure-sensitive layers. Such compositions, can only be applied usefully when the surfaces to be treated (e.g., roofs and walls) have been made dry and are moreover oil-free and dust-free since the compositions tend to recover their original configuration when the applied deforming forces are removed, especially after short loading times.

SUMMARY OF THE INVENTION

It has now been found that compositions comprising at least a certain bituminous component, a thermoplastic polymeric component and a lithium salt of a (hydroxy) fatty acid have plastic properties, i.e., deformations resulting from a particular stress are retained to a large extent even after removal of the stress, which make them very useful for application as self-adhesive compounds as they are also shear-stable. The compositions according to the present invention are also cold applicable and, moreover, also applicable on wet or even wetted surfaces. They also exhibit a substantial permanent set on dusty or sandy surfaces. This latter feature greatly enhances their window of application when the plastic bituminous compositions are to be used as cold applicable plastic self-adhesive compounds, e.g., as roofing adhesives, mopping adhesives or as joint sealants. Also, their "open time" is not critical.

The present invention therefore relates to plastic bituminous compositions comprising:

(a) 100–30% weight (w) of a mixture of
1. 45–99.8% w of a bituminous component having a penetration of less than 800 (0.1 mm) at 25° C.,
2. 0.1–30% w of a lithium salt of a $C_{10}$–$C_{40}$ (hydroxy) fatty acid, and
3. 0.1–25% w of a thermoplastic polymer, and (b) 0–70% w of a filler.

DETAILED DESCRIPTION OF THE INVENTION

The bituminous component present in the plastic bituminous compositions according to the present invention may be a naturally occurring bitumen or derived from a mineral oil. Also petroleum pitches obtained by a cracking process and coal tar can be used as the bituminous component as well as blends of various bituminous materials.

Examples of suitable components include distillation or "straight-run bitumens", precipitation bitumens, e.g., propane bitumens, blown bitumens and mixtures thereof. Other suitable bituminous components include mixtures of one or more of these bitumens with extenders such as petroleum extracts, e.g., aromatic extracts, distillates or residues. Suitable bituminous components (either "straight-run bitumens" or "fluxed bitumens") are those having a penetration < 800 (0.1 mm) at 25° C. Preference is given to the use of bitumens having a penetration of from 100 to 500 (0.1 mm) at 25° C. The amount of bituminous component to be used in the plastic bituminous compostions is preferably 75 and 99.5% w calculated on mixtures containing 30–100% of the ingredients 1, 2 and 3.

Any thermoplastic polymeric component which does not significantly impair the plastic properties of the plastic bituminous compositions according to the present invention can be used. Suitable thermoplastic polymeric components are for instance thermoplastic polymers prepared by the polymerization of olefinically unsaturated monomers. These polymers may be either homopolymers or copolymers and may be hydrogenated or unhydrogenated. The polymers may be prepared from monomers which contain exclusively carbon and hydrogen. Examples of such polymers are polyethylene, polypropylene, polyisobutylene, polyisoprene, polybutadiene, ethylene-propylene copolymers and styrene-butadiene copolymers. Good results have been obtained using styrene-butadiene copolymers. The polymers may also be prepared from monomers which, in addition to containing carbon and hydrogen, at least in part contain one or more other elements, such as oxygen. Examples of such polymers are ethylene-vinyl acetate copolymers, ethylene-ethyl acrylate copolymers and ethylene-n-butyl acrylate copolymers. Some commercial thermoplastic polymers may be in admixture with various extender oils and these compositions may also be used as a component of the self-adhesives. Any extender oil present is regarded as a part of the bituminous component insofar as the %w of the components of the present invention are concerned. The preferred amount of polymeric component present in the compositions according to the invention is from 0.1–10% w as those compositions have the most pronounced plastic properties.

A further class of thermoplastic polymers for use as a component of the plastic bituminous compositions are block copolymers having the general configuration:

A-B-(-B-A)$_n$, wherein each A is a thermoplastic polymer block of a monovinyl aromatic hydrocarbon or a 1-alkene, B is an elastomeric polymer block of a conjugated diene or more than 1-alkene and n is an integer, suitably from 1 to 5, or a (partly) hydrogenated derivative of the block copolymer.

The polymer blocks A preferably have a number average molecular weight, in the range of from 2,000 to 100,000, particularly from 7,500 to 50,000. The polymer block B preferably has an average molecular weight in the range of from 25,000 to 1,000,000, particularly from 35,000 to 150,000. Whenever according to the branched configuration two or more blocks B are immediately adjacent to each other they are treated as a single block for purposes of molecular weight. The amount of polymer blocks A in the block copolymers preferably ranges from 10 to 70% w, particularly from 20 to 50% w.

Suitable examples of block copolymers are: polystyrene-polyisoprene-polystyrene, polystyrene-polybutadiene-polystyrene, polyethylene(ethylene-propylene copolymer)-polyethylene, polypropylene-(ethylenepropylene copolymer)-polypropylene, and their hydrogenated counterparts.

The block copolymers may be formed by a number of different types of processes known in the art.

Linear and branched block copolymers can be used as well as the so-called star-shaped polymers which are obtained by using polyalkenyl coupling agents, e.g., divinyl pyridine and polyvinylbenzenes such as divinylbenzene in the polymerization process.

The block copolymers may be hydrogenated if desired by any suitable technique. The hydrogenation may be complete or partial. It is also possible to selectively hydrogenate just the center block so as to convert, e.g., a polyisoprene block to an ethylene propylene rubber (EPR) block.

Mixtures of one or more thermoplastic polymers may also be used. Suitable mixtures are referred to in the Dutch patent application Nos. 7,411,373 and 6,706,408.

The third essential component in the plastic bituminous compositions according to the present invention comprises a lithium salt of a $C_{10}$-$C_{40}$ (hydroxy) fatty acid. Preferred are the lithium salts of (hydroxy) fatty acids having 12-22 carbon atoms. Good results can be obtained by using, e.g., lithium stearate, lithium hydroxystearate, lithium palmitate and lithium (hydroxy) palmitate. Lithium salts of unsaturated fatty acids may also be suitably applied as well as mixtures of various lithium salts of (hydroxy) fatty acids. The amount of lithium salt(s) to be applied is preferably in the range of from 2-15% w, calculated on mixtures containing 30-100% w of the ingredients 1, 2 and 3.

The plastic bituminous compositions according to the present invention may also contain one or more fillers. Amounts of filler(s) up to 70%, calculated on the total mixture of the ingredients 1, 2, 3 and filler may be suitably applied. The fillers can be of inorganic and/or organic nature and are known to those skilled in the art. Examples of suitable fillers comprise chalk, limestone, unbaked powdered gypsum, talcum, fly ash, coal combution waste, pigments such as titanium dioxide, iron oxide, chromium oxide, diatomaceous earth and other clays, quartz flour and the various carbon blacks. Preferred amounts of filler to be used in the plastic bituminous compositions range from 15-60 %w on total mixture. Most preferred are filler amounts in the range of from 25 to 50% w on total mixture.

If desired, the plastic bituminous compositions according to the present invention may also contain a solvent which may facilitate the applicability of the compositions. The use of a solvent may lead to thixotropic pastes which have a trowelling or brushing consistency. Examples of suitable solvents having a boiling point between 30° and 250° C. comprise hydrocarbons, especially aromatic hydrocarbons such as benzene, toluene and the xylenes. Good results have been obtained using xylenes as solvents. Halogenated hydrocarbons and especially chlorinated hydrocarbons can also be used as solvents. Examples of halogenated hydrocarbons comprise dichloromethane, trichloromethane, 1,1,1-trichloroethane and 1,1,2,2-tetrachloroethane. Preferably, the solvents applied should at the one hand improve the handleability of the compositions and at the other hand be capable of easy removal.

The amount of solvent to be used is not critical and can vary between wide limits which are basically determined by the type of (fluxed) bitumen used and the intended application of the plastic bituminous compositions. Amounts of solvents up to 50% w, calculated on the total mixture of the ingredients 1, 2 and 3 can be used suitably, preference being given to the use of solvents in an amount of up to 25% w. The solvent may be incorporated into the plastic bituminous composition as such but it may also be mixed with one or more of the ingredients 1, 2 and 3 prior to the preparation of the composition.

The plastic bituminous compositions according to the present invention may be prepared by various methods. A convenient method comprises blending of the (fluxed) bitumen and the thermoplastic polymeric component at elevated temperature, followed by the addition of the appropriate lithium salt of a (hydroxy) fatty acid at a temperature above the melting point of the said lithium salt.

Solvent containing compositions can be suitably prepared by blending a pre-blend containing a bituminous component, a lithium salt and a filler, if desired, with a polymer/solvent blend. The pre-blend can be obtained by mixing the bituminous component, the lithium salt and the filler, if any, at a temperature above the melting point of the lithium salt. It is also possible to blend part of the appropriate bitumen and all of the thermoplastic elastomeric component which mixture is then blended with a blend of the remaining part of the bitumen and the appropriate lithium salt. Finally, the filler, if any, is blended with the bitumen/polymer/salt composition. Optionally, a solvent can also be added to the ready composition.

As stated hereinbefore, the plastic bituminous compositions according to the present invention are extremely suitable as cold applicable self-adhesive compounds. The present invention therefore also relates to articles having self-adhesive properties which contain a plastic bituminous composition comprising
(a) 100-30% w of a mixture of
  1. 45-99.8% w of a bituminous component having a penetration of less than 800 (0.1 mm) at 25° C.,
  2. 0.1-30% w of a lithium salt of a $C_{10}$-$C_{40}$ (hydroxy) fatty acid, and
  3. 0.1-25% w of a thermoplastic polymer, and
(b) 0-70% w of a filler.

Pressure-sensitive adhesives differ from other adhesives in that they function immediately upon application without any physical or chemical change in the adhesive layer being involved; they must provide instantaneous adhesion when applied under light pressure (see, e.g., Kirk-Othmer, Encyclopedia of Chemical Technology, 2nd edition, volume 1, page 382).

Articles having a pressure-sensitive layer are, for example, sheets of roofing materials, in particular of synthetic roofing material, e.g., butyl rubber, ethene-propene rubber sheets, pressure-sensitive labels or pressure-sensitive foils, e.g., aluminum, insulating tapes for electrical devices, medical adhesive tapes and sound-deadening materials. Also considered as articles having a pressure-sensitive layer are roofs having a cold layer of the pressure-sensitive layer. This method of application of pressure-sensitive adhesives is of special utility for materials having a low heat distortion temperature such as formed polystyrene sheets which may be cold-stuck on roofs or against walls in this way. Reference is made to British Patent Specification No. 1,481,506 with respect to properties and performance of articles having pressure-sensitive layers.

The plastic bituminous compositions according to the present invention can also be used as cold applicable mopping adhesives for roofing materials such as roofing felts and insulation panels. The cold applicability is a distinct advantage over the hot melt application normally used for conventional bituminous mopping adhesives. The plastic bituminous compositions maintain their tackiness over longer periods so that no critical "open time" requirements have to be obeyed. This is an advantage over conventional bitumen/solvent adhesives (cutbacks). Another advantage over such cutbacks is the applicability on inclined substrates due to their adequate flow resistance. The adherability to wet(ted) and dusty surfaces is a further advantage over traditional solvent-free adhesives.

The plastic bituminous compositions according to the present invention can also be used as joint sealants, e.g., between building elements. The compositons are particularly suitable for application in vertical joints as they can be applied at ambient temperature and, moreover, exhibit an adequate resistance to flow at temperatures up to 90° C. An important advantage is the possibility of applying them under wet conditions.

The present invention is illustrated by means of the following Examples.

EXAMPLE 1

A plastic bituminous compositions was prepared by mixing 47.5% w of a bituminous component having a penetration of 300 (0.1 mm) at 25° C. (ASTM D5): 2% w of a styrene-butadiene copolymer having the average mol. weight 550,000; 5.5% w of lithium stearate and 45.0% w of a limestone filler.

The plastic bituminous composition obtained showed a good tackiness (4.5 N at 23° C. as determined by ASTM D2979). The resistance to flow was measured by coating aluminum foil (5 cm×5 cm; 140–220 g/m$^2$) with 1.5 mm thick layer of the plastic bituminous composition. The coated foil was then placed vertically in an oven having a temperature of 90° C. After 14 days at this temperature no flow could be detected.

The plastic bituminous composition was applied on a steel pipe under dry and wet conditions (1.5 mm layer of plastic bituminous composition, layer width 5 cm). The results are given in the Table.

| Rate mm/min | Peel force, N (kg/cm width at 25° C.) | | |
|---|---|---|---|
| | dry[1] | wet/dry[2] | wet/wet[3] |
| 5 | 2.2 | 2.6 | 0.2 |
| 10 | 4 | 4.2 | 0.5 |
| 20 | 6 | 4.5 | 0.8 |

-continued

| Rate mm/min | Peel force, N (kg/cm width at 25° C.) | | |
|---|---|---|---|
| | dry[1] | wet/dry[2] | wet/wet[3] |
| 50 | 10.2 | 6 | — |

[1]dry applied, stored in air for 24 h
[2]wet applied, stored in air for 24 h
[3]wet applied, stored under water for 24 h, wet measured.

From the results it is clear that the plastic bituminous composition according to the present invention does not only possess a more than adequate peel strength under the classical dry conditions but that it even stuck when applied, stored and measured under wet conditions. The adhesive apparently was able to penetrate the water layer locally, which resulted in peeling at fluctuating forces. When the wet specimen was allowed to dry, the peeling force reached the maximum value.

EXAMPLE 2

The plastic bituminous composition described in Example 1 was fluxed with xylene in order to facilitate its application. Two compositions were made containing respectively 7.5% w and 15% w of xylene on total composition. The compositions obtained are thixotropic pastes which could be used easily on steep surfaces. They could also be spread without formation of strings. The "open time" period exceeded several hours which made the plastic bituminous compositions very suitable for outdoor applications. Moreover, the presence of an excess of water did not significantly influence the tackiness.

What is claimed is:
1. Plastic bituminous compositions comprising
(a) 100–30% w of a mixture of
  1. 45–99.8% w of a bituminous component having a penetration of less than 800 (0.1 mm) at 25° C.,
  2. 0.1–30% w of a lithium salt of a $C_{10}$–$C_{40}$ (hydroxy) fatty acid, and
  3. 0.1–25% w of a thermoplastic polymer having the general configuration A-B-(-B-A)$_n$, wherein each A is a thermoplastic polymer block of a monovinyl aromatic hydrocarbon, each B is an elastic polymer block of a conjugated diene or hydrogenated elastic polymer block of a conjugated diene and n is an integer, and
(b) 0–70% w of a filler.

2. A composition according to claim 1 wherein the bituminous component has a penetration of from 100 to 500 (0.1 mm) at 25° C.

3. A composition according to claim 1 or 2 wherein the amount of the bituminous composition is from 75 to 99.5% w.

4. A composition according to claim 1 wherein the amount of thermoplastic polymer is from 0.1–10% w.

5. A composition according to claim 1 wherein the lithium salt is a lithium salt of a $C_{12}$–$C_{22}$ (hydroxy) fatty acid.

6. A composition according to claim 5 wherein the amount of lithium salt is from 2–15% w.

7. A composition according to claim 1 wherein the amount of filler if from 15–60% w.

8. A composition according to claim 1 which also contains a solvent having a boiling point between 30° and 250° C.

9. A composition according to claim 8 wherein up to 50% w of a solvent is present.

10. A composition according to claim 5 wherein the lithium salt is lithium stearate.

* * * * *